US011820418B1

(12) United States Patent
Jackson

(10) Patent No.: US 11,820,418 B1
(45) Date of Patent: Nov. 21, 2023

(54) STROLLER HANDLES

(71) Applicant: Curious Innovations, LLC, Chicago, IL (US)

(72) Inventor: Tanya Jackson, Chicago, IL (US)

(73) Assignee: Curious Innovations, LLC, Chicago, IL (US)

(*) Notice: Subject to any disclaimer, the term of this patent is extended or adjusted under 35 U.S.C. 154(b) by 0 days.

(21) Appl. No.: 17/831,890

(22) Filed: Jun. 3, 2022

Related U.S. Application Data

(60) Provisional application No. 63/197,393, filed on Jun. 5, 2021.

(51) Int. Cl.
*B62B 9/20* (2006.01)
*B62B 7/04* (2006.01)

(52) U.S. Cl.
CPC ................ *B62B 9/20* (2013.01); *B62B 7/042* (2013.01)

(58) Field of Classification Search
CPC ................................. B62B 9/20; B62B 7/042
See application file for complete search history.

(56) References Cited

U.S. PATENT DOCUMENTS 5,876,309 A 3/1999 Archey
6,098,993 A 8/2000 Bellinson
6,196,947 B1 3/2001 Anderson
6,722,689 B2 4/2004 Kreamer
8,342,564 B2 1/2013 Popp
9,840,266 B2 12/2017 Caradec et al.
11,447,169 B2 * 9/2022 Sklenar ..................... B62B 9/20
2007/0126195 A1 6/2007 Dresher
2008/0238024 A1 10/2008 Heidenreich et al.
2008/0296326 A1 12/2008 Berlin et al.
2014/0008883 A1 * 1/2014 Litman .............. A63B 23/1209
280/47.38
2015/0069738 A1 3/2015 Knight et al.
2020/0262463 A1 8/2020 Villarreal
2021/0188340 A1 6/2021 Dalton

FOREIGN PATENT DOCUMENTS

WO WO-2022073118 A1 * 4/2022

* cited by examiner

*Primary Examiner* — John D Walters
(74) *Attorney, Agent, or Firm* — Kintner IP, LLC; Mary Frances Ludwig

(57) ABSTRACT

The handles for a stroller facilitate the natural periodic arm movement of a user propelling and steering the stroller while walking, jogging, or running. The handles include a first arm and a second arm each having hand grips. Each of the arms is configured for connection to the frame of the stroller such that the distal ends of the arms move forwardly and rearwardly with respect to the stroller. A dampening mechanism resists motion of each of the arms. A handle apparatus may be removably connectable to the frame of the stroller. The first arm may be tensionably coupled to the second arm and/or the first arm may be crossed over the second arm. Adjustable features are provided to customize the handles to the arm swing of the user.

20 Claims, 7 Drawing Sheets

STROLLER HANDLES

CROSS REFERENCE TO RELATED APPLICATION

This application claims the benefit of U.S. Provisional Application No. 63/197,393, filed Jun. 5, 2021, which is hereby incorporated in its entirety.

TECHNICAL FIELD

The present invention pertains generally to handle devices, and more particularly to handles for a stroller.

BACKGROUND OF THE INVENTION

There are numerous strollers which are designed to be propelled by a user while jogging, running, or walking. Such strollers typically include a frame and three wheels which rollably support the frame on the ground surface. An elongated transverse push bar commonly extends across the rear of the stroller. This push bar may be gripped by the user while jogging in order to propel the stroller.

It is well known that when running or walking, the limbs of the human body move in a synchronous, rhythmic manner. At any given time during the act of running, the position of each arm is highly dependent on the position of the other. Positional dependence of the limbs while running is crucial to the human body's ability to locomote in a fluid, balanced, and coordinated manner. Disruption of coordinated limb motion during running can result in reduced energy efficiency, deterioration of general running performance, and, in some cases, an increased risk of injury to the runner.

If a user jogs while gripping the push bar of a stroller with their hands, the user cannot maintain a natural jogging stride, i.e. with their arms swinging by their sides. There is a need in the art for handles for a stroller that can accommodate the user's natural, unique, and synchronous arm motion while also distributing the force required to propel the stroller between both arms of the user.

BRIEF SUMMARY OF THE EMBODIMENTS

Embodiments disclosed herein are directed to stroller handles which facilitate the natural periodic arm movement of a user propelling a stroller while walking, jogging or running. The stroller handles provide multiple adjustments designed to allow the user to move their arms in their own unique arm swing path while advancing the stroller. Embodiments of the stroller handles may be attached to a cooperating stroller (e.g., mounted to a stroller push bar) or may be an element of a stroller system.

According to one or more embodiments, a handle apparatus is configured for attachment to a cooperating stroller having a frame, the handle apparatus comprising:

- a first arm having a first distal end and a first proximal end;
- a second arm having a second distal end and a second proximal end;
- two hand grips, each located at one of the first proximal end and the second proximal end;
- a dampening mechanism configured to resist motion of each of the first arm and the second arm; and
- each of the first arm and the second arm being configured for connection to the frame of the stroller such that the first distal end and the second distal end are configured for forward and rearward motion with respect to the stroller.

According to one or more embodiments, the first arm is tensionably coupled to the second arm.

According to one or more embodiments, the first arm and the second arm are pivotably connected to the frame of the stroller.

According to one or more embodiments, the dampening mechanism includes one or more bumpers.

According to one or more embodiments, the first arm is connected to the second arm intermediate the first distal end and the first proximal end.

According to one or more embodiments, the first arm is coupled to the second arm such that forward motion of one of the first arm or the second arm imparts a rearward force to the other of the first arm or the second arm.

According to one or more embodiments, at least a portion of the first arm crosses over at least a portion of the second arm.

According to one or more embodiments, at least a portion of each of the first arm and the second arm has an adjustable length.

According to one or more embodiments, the hand grips are pivotably connected to the first proximal end and the second proximal end.

According to one or more embodiments, the forward and rearward motion of the first distal end and the second distal end occurs in a plane above the stroller.

According to one or more embodiments, the forward and rearward motion of the first distal end and the second distal end describes an arcuate or horn-shaped travel path.

These and other aspects of the embodiments will be better appreciated and understood when considered in conjunction with the following description and the accompanying drawings. The following description, while indicating various embodiments and details thereof, is given by way of illustration and not of limitation. Many substitutions, modifications, additions, or rearrangements may be made within the scope of the embodiments, and the embodiments may include all such substitutions, modifications, additions, or rearrangements.

BRIEF DESCRIPTION OF THE DRAWINGS

Non-limiting and non-exhaustive embodiments of the stroller handles are described with reference to the following figures, wherein like reference numerals refer to like parts throughout the various views unless otherwise specified.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

DETAILED DESCRIPTION OF THE INVENTION

Figure 1:
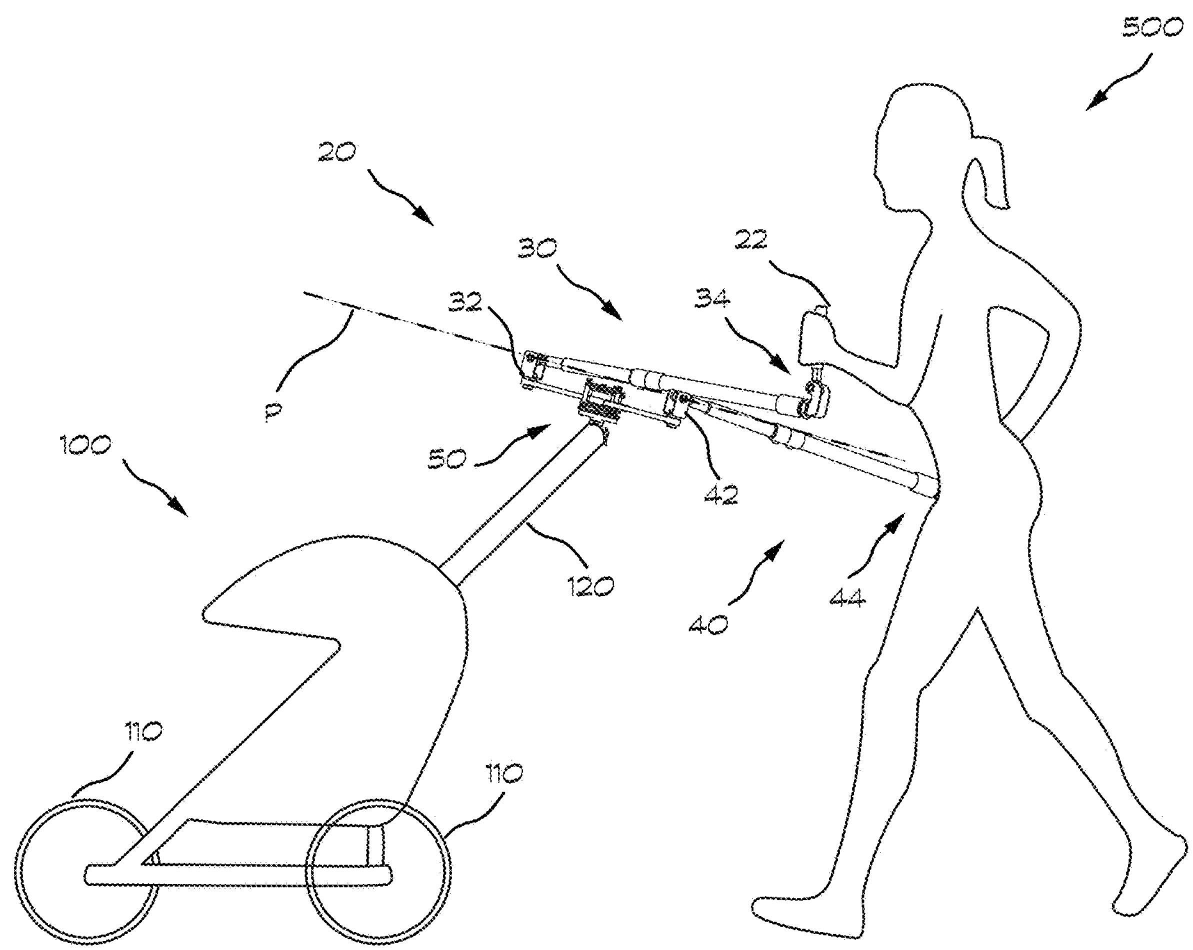
FIG. 1 is an example illustration of a reduced side elevation view of an embodiment of a stroller handle apparatus in a configuration of use.

FIG. 1 is an example illustration of an embodiment of a stroller handle apparatus generally designated as 20. Handle apparatus 20 is shown attached to a cooperating stroller 100, and the stroller is being pushed by a user 500. As used herein, a stroller may refer to a jogging or running stroller or a conventional stroller (also referred to as a buggy). The stroller may be designed to transport infants, children, adults, animals, or cargo. In some cases, the handle apparatus may cooperate with another type of transport device, such as a cart or other device configured for transporting items. Stroller 100 is shown with three wheels 110, however the cooperating stroller may have more or fewer wheels.

In general, handle apparatus 20 includes a first arm 30 and a second arm 40. First arm 30 has a first distal end 32 and a first proximal end 34. Second arm 40 has a second distal end 42 and a second proximal end 44. As used herein, proximal refers to a direction or orientation toward the user, while distal refers to a direction or orientation away from the user. A hand grip 22 is located at each of the first proximal end 34 and the second proximal end 44; in other words, two hand grips 22 are present on handle apparatus 20.

First arm 30 and second arm 40 are each configured for connection to a frame 120 of stroller 100. In the shown embodiment, first arm 30 and second arm 40 are shown connected to an upper component of frame 120, such as a push bar. First arm 30 and second arm 40 may be independently connected to frame 120, or may share a point of connection. A shared point of connection may be, for example, an intermediate member of the apparatus to which the first arm and the second arm are both attached, such as a housing 50. Housing 50 may at least partially enclose a coupling mechanism 52.

Figure 2:
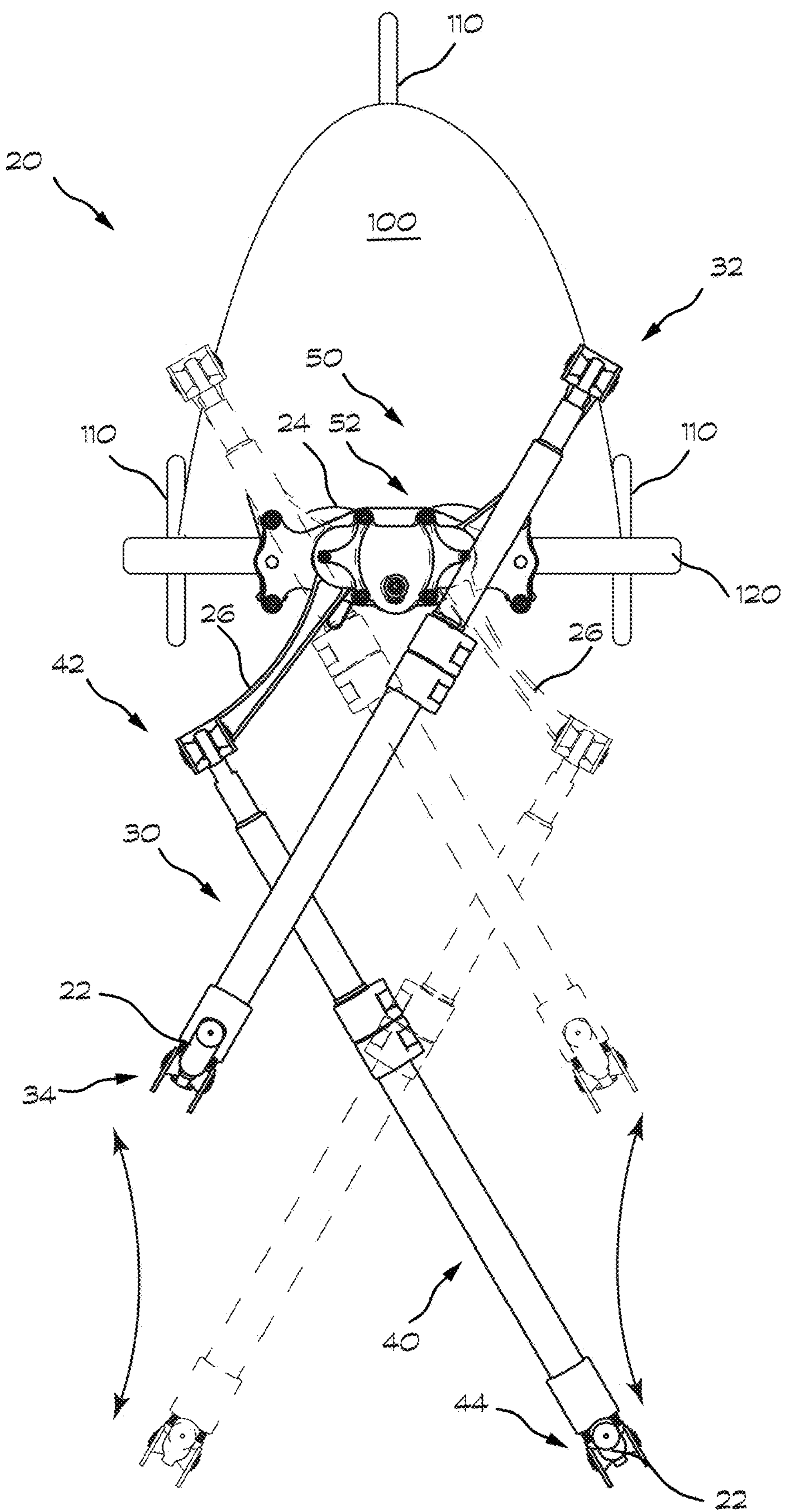
FIG. 2 is a top plan view of an embodiment of the stroller handle apparatus in alternate positions.

FIG. 2 illustrates alternate positions of first arm 30 and second arm 40, where each arm may travel from a position shown in solid lines to a position shown in dashed lines, with handle grips 22 traveling generally along the path indicated by the bold directional arrows. As shown in the embodiment of FIG. 2, a user pushing the stroller forward and swinging their arms naturally while gripping hand grips 22 may position the first and second arms between the alternate positions shown (or into intermediate positions within the range of motion, depending on the size of the user and sweep of their arm movement). In general, first distal end 32 and second distal end 42 are each configured for forward and rearward motion with respect to stroller 100. As used herein, the terms "forward" and "rearward" are used with reference to a direction of motion of the stroller. First proximal end 34 and second proximal end 44 are similarly configured for forward and rearward motion with respect to stroller 100.

In some embodiments, first arm 30 is coupled to second arm 40 such that forward motion of one of arms 30 or 40 imparts a rearward force to the other one of arms 30 or 40. To achieve this effect, first arm 30 and second arm 40 may be joined by a coupling mechanism 52, such as one or more links, gears, pulleys, elastic members, other coupling members, or combinations thereof. Said another way, with reference to FIG. 2, as second arm 40 is moved forwardly from the position shown in solid lines to the position shown in dashed lines, a coupling mechanism 52 between first arm 30 and second arm 40 may impart a force to first arm 30 to assist in moving first arm 30 rearwardly from the position shown in solid lines to the position shown in dashed lines. Similarly, when first arm 30 is moved rearwardly a coupling mechanism may impart a force to second arm 40 to assist in moving forwardly.

One or more dampening mechanisms may be connected to handle apparatus 20 and configured to resist motion of first arm 30 and second arm 40. For example, dampening mechanisms shown in FIG. 2 are two bumpers 24. Either first arm 30 or second arm 40 may contact one of bumpers 24 when moved rearwardly (more specifically, in this case, a swing arm 26 connected to first distal end 32 or second distal end 42 may contact a bumper 24, thereby resisting motion of the connected first arm 30 or second arm 40). In other embodiments, bumper 24 may be differently sized, and may limit the range of motion of swing arm 26 to less than the range shown in FIG. 2. In other embodiments, the dampening mechanism may be a spring, an elastic member, a brake system, a hydraulic system, a pneumatic system, or the like. The dampening mechanism may provide a smoother ride for the passenger or cargo. In some cases, the dampening mechanism may also provide an impetus for the arm to change direction from rearward to forward motion (e.g., by retraction of a spring or deflection off a bumper).

Figure 3:
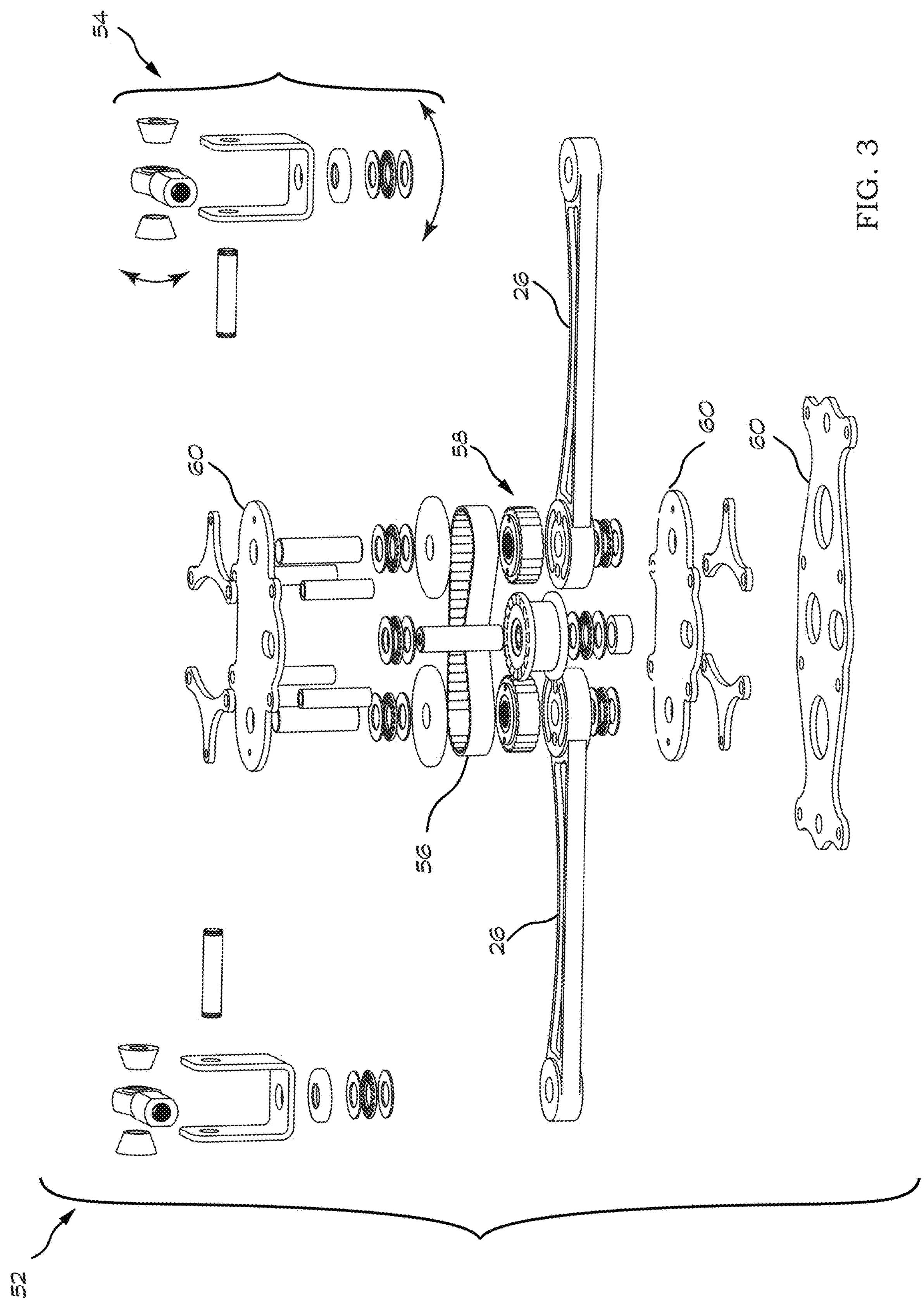
FIG. 3 is an exploded perspective view of an embodiment of a coupling mechanism of the stroller handle apparatus.

FIG. 3 is an exploded perspective view of an embodiment of a coupling mechanism 52 (fasteners and other components have been omitted for clarity of the view). Two swing arms 26 are each connected to a joint assembly 54. First arm 30 and second arm 40 are each configured for connection to one joint assembly 54, such as by a threaded connection, a pin, or other type of fastening connection. Each joint assembly 54 is configured for adjustable positioning in two directions, as indicated by the directional arrows (e.g., joint assembly 54 may have adjustable yaw and pitch rotations relative to swing arm 26). This feature allows first arm 30 and second arm 40 to be positioned for user comfort, for example, to accommodate a user's unique, natural arm swing path while running, jogging, or walking, and/or to adjust for body size (e.g., height, arm length, etc.).

In the shown embodiment, first arm 30 may be tensionably coupled to second arm 40 via a belt 56 and one or more pulleys 58. When one of arms 30 or 40 is moved forwardly, the tension of belt 56 and pulleys 58 provides a rearward force to the other one of arms 30 or 40. In embodiments, coupling mechanism 52 may be adjustable to increase or decrease the tension between the arms (e.g., by increasing the tension on belt 56). In other embodiments, first arm 30 and second arm 40 may be tensionably coupled by one or more elastic members, one or more springs, or another tension device.

Housing 50 (see FIG. 2) may enclose all, or a portion of, coupling mechanism 52, first arm 30, second arm 40, other connecting members such as swing arms 26, or dampening mechanism 24. In this embodiment, housing 50 includes one or more plates 60.

Figure 4:
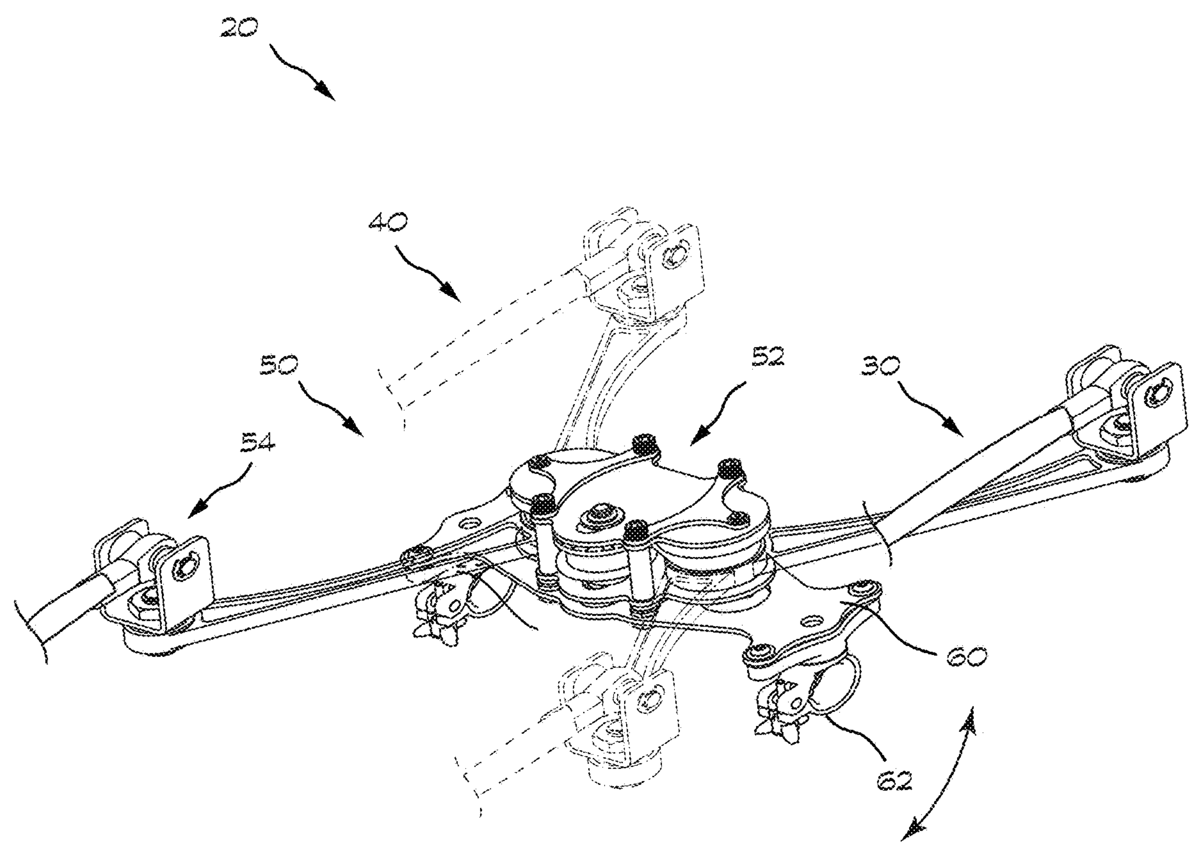
FIG. 4 is a perspective view of another embodiment of the stroller handle apparatus in alternate positions.

FIG. 4 is a perspective view of another embodiment of handle apparatus 20 in alternate positions. Handle apparatus 20 of the shown embodiment is removably connectable to a stroller frame by one or more clamps 62, shown mounted to and extending downwardly from a plate 60 of housing 50.

As indicated by the directional arrow, the entire handle apparatus 20, including first arm 30 and second arm 40, may be pivoted about the frame of the stroller (not shown) by rotating the apparatus to a desired position and clamping clamps 62 in place. In one example, clamps 62 may be attached to a push bar 120 of a stroller (see FIG. 2).

As seen in FIGS. 1-2, embodiments of handle apparatus 20 may include at least a portion of first arm 30 crossing over at least a portion of second arm 40. In other words, one of first arm 30 or second arm 40 may pass above or below the other arm 30 or 40. In such a configuration the proximal end of either arm may be held by the user on an opposite side from the connection of the distal end of the same arm. For example, first proximal end 34 of first arm 30 is located on the left side of stroller 100, while first distal end 32 is connected on the right side of stroller 100. The first and second arms may be positioned between the alternate positions shown or into intermediate positions within the range of motion, depending on the size of the user and sweep of their arm movement (e.g., a specific user may not utilize the full range of motion available).

In the embodiment of FIG. 4, first arm 30 and second arm 40 do not cross over one another. First arm 30 and second arm 40 may be substantially parallel to one another, or may be angled inwardly toward one another as desired by the user. Joint assemblies 54 may allow adjustment of the angle between first arm 30 and second arm 40.

In both of the embodiments of FIGS. 2 and 4, the forward and rearward motion of each of first distal end 32 and second distal end 42 occurs substantially in a plane. The plane of motion may be substantially horizontal, as shown in FIG. 2. The plane of motion may alternately be angled about the stroller push bar, as indicated by plane '13' of FIG. 1. Angling plane P about the stroller frame may be achieved by positioning housing 50 and locking clamps 62 as discussed in more detail herein. In this way, the forward and rearward motion of the distal ends may also include an upward and downward component. First distal end 32 and second distal end 42 may move in the same plane as one another, such as in the case where first arm 30 and second arm 40 are positioned side by side. First distal end 32 and second distal end 42 may move in offset planes, such as in the case where first arm 30 and second arm 40 cross over one another. When the plane of motion is angled with respect to the stroller, motion of the distal ends 32, 42 will have both a forward/rearward and upward/downward component.

Figure 8:
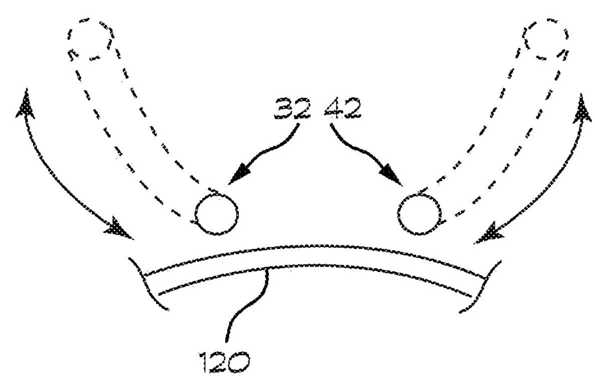
FIG. 8 is a schematic illustration of a travel path of the stroller handles.

In yet another configuration, as illustrated in FIG. 8, distal ends 32 and 42 may move forwardly and rearwardly along an arcuate or a horn-shaped travel path, rather than in a plane. In such embodiments, the forwardmost position of the distal end may be higher than the readwardmost position; in other words, a distal end 32, 42 may travel upward while the arm is moving forward and may travel downward while the arm is moving rearward. In this configuration, first arm 30 and second arm 40 may or may not be independently connected to the stroller (e.g., stroller frame 120), crossed over one another, or connected to one another.

Figure 5:
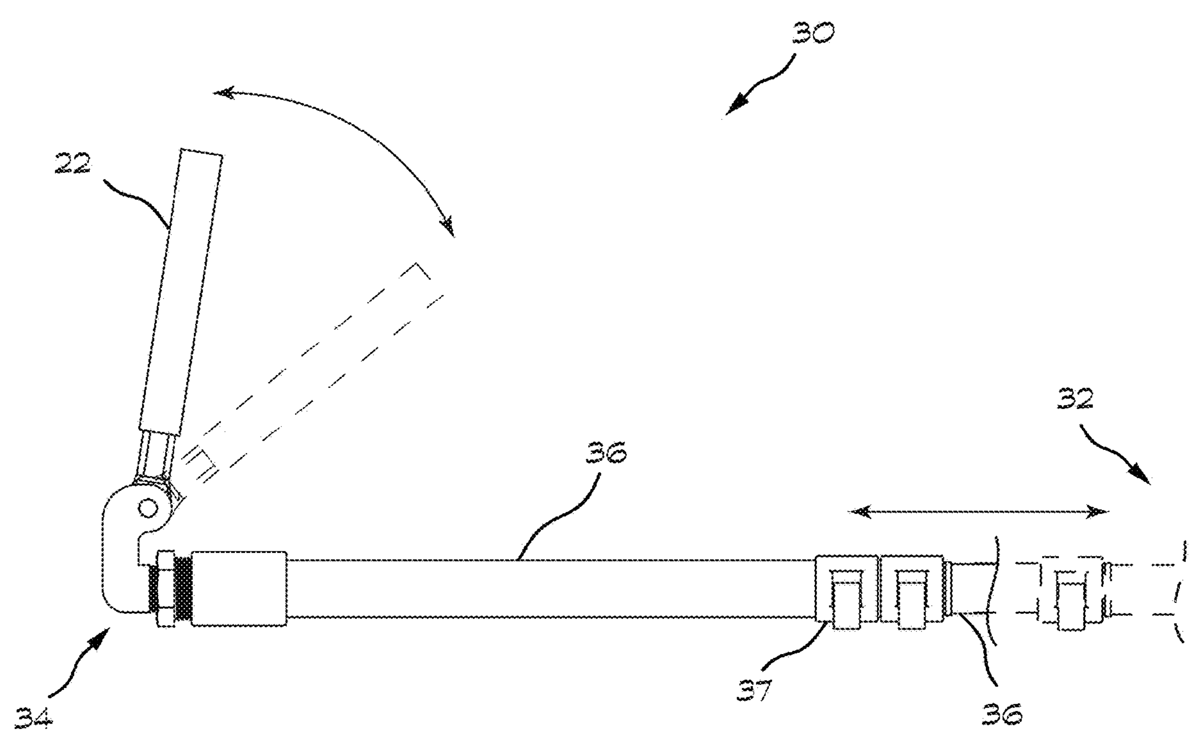
FIG. 5 is a side elevation view of an embodiment of a first arm of the stroller handle apparatus, the second arm being a mirror image.

FIG. 5 is a side elevation view of an embodiment of first arm 30. Second arm 40 is substantially a mirror image of first arm 30. In the shown embodiment, first arm 30 includes multiple tubular members 36 configured to slidingly engage with one another. In this configuration the length of at least a portion of first arm 30 may be adjusted by releasing an arm clamp 37, sliding an inner tubular member 36 outwardly from an outer tubular member 36 (e.g., along the directional arrow into the position shown in dashed lines) and engaging arm clamp 37 with the tubular members positioned to achieve a desired length of first arm 30. In this manner the length of either the first arm or the second arm may be adjusted as desired by the user. In other configurations, the adjustment of the arm length may be achieved by a locking pin, a twist-lock device, or other arrangements readily apparent to a skilled artisan.

Hand grip 22 is shown pivotably connected to first proximal end 34. For example, hand grip 22 may pivot inwardly between the positions shown in solid and dashed lines, and may also or instead pivot outwardly. In embodiments, hand grip 22 may freely pivot so that a user may continuously adjust the position of the hand grip while moving the stroller.

Figure 6:
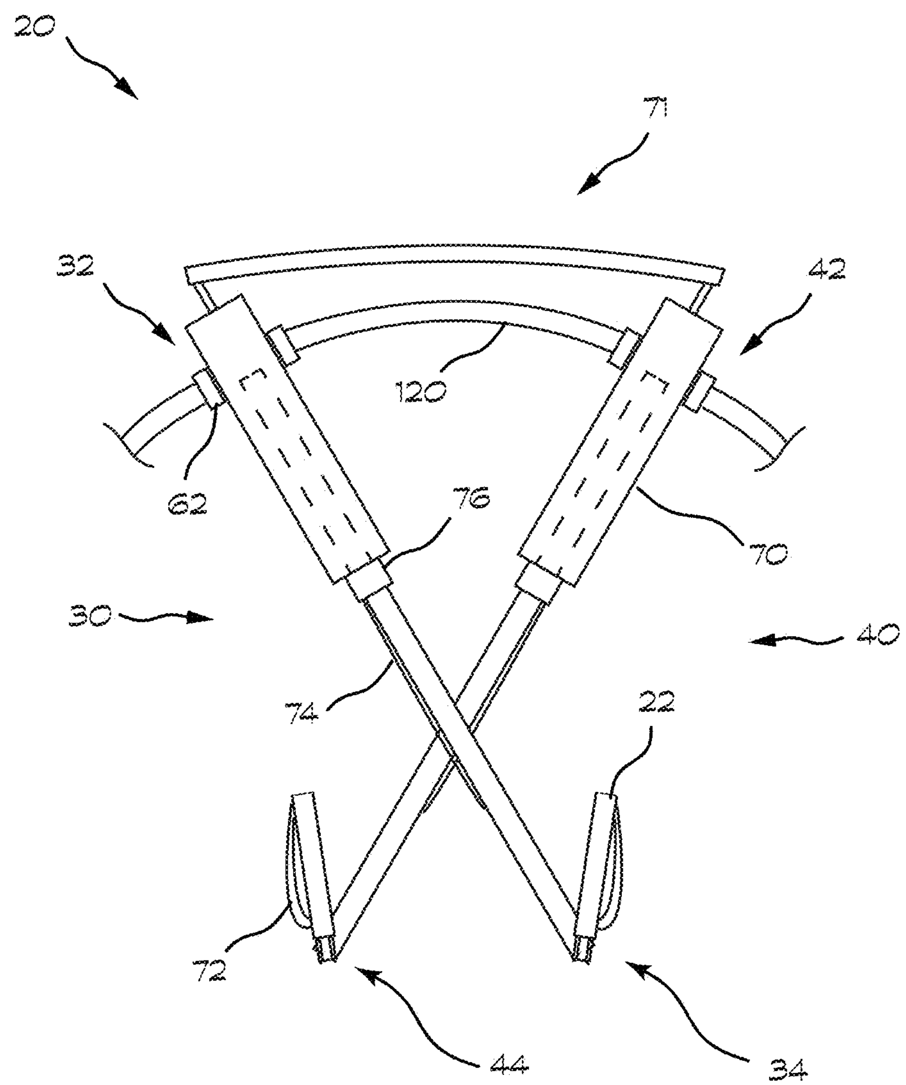
FIG. 6 is a schematic illustration of another embodiment of the stroller handle apparatus.

FIG. 6 is a schematic illustration of another embodiment of handle apparatus 20 shown connected to push bar 120 of a cooperating stroller. In this embodiment, first arm 30 and second arm 40 are crossed over one another as described with reference to FIG. 2. Handles 22 are connected to proximal ends 34, 44 of each arm 30, 40. First distal end 32 and second distal end 42 (shown hidden in dashed lines) are each mounted within an arm base 70. Each arm base 70 is independently connected to a push bar of stroller frame 120, for example by a clamp 62 as described above. Arm bases 70 are tensionably connected by an elastic band 71.

Distal ends 32, 42 are slidably mounted within each arm base 70, such that distal ends 32, 42 are configured to move forwardly and rearwardly with respect to the stroller. The travel of distal ends 32, 42 with arm bar 70 may be guided, for example, by one or more casters riding in a groove or track, or aided by one or more rollers. In other embodiments, distal ends 32, 42 may slide through a guide directly mounted stroller frame 120.

Each handle 22 may include a brake lever 72 used to operate a brake cable 74 or air tube which actuates a brake 76 mounted on each of first arm 30 and second arm 40. The user may operate the brakes by squeezing one or both of brake levers 72 to slow or stop motion of the arms and/or the stroller. A brake system including one or more of brake lever 72, brake cable 74, and brake 76 is another example of a dampening mechanism.

Figure 7:
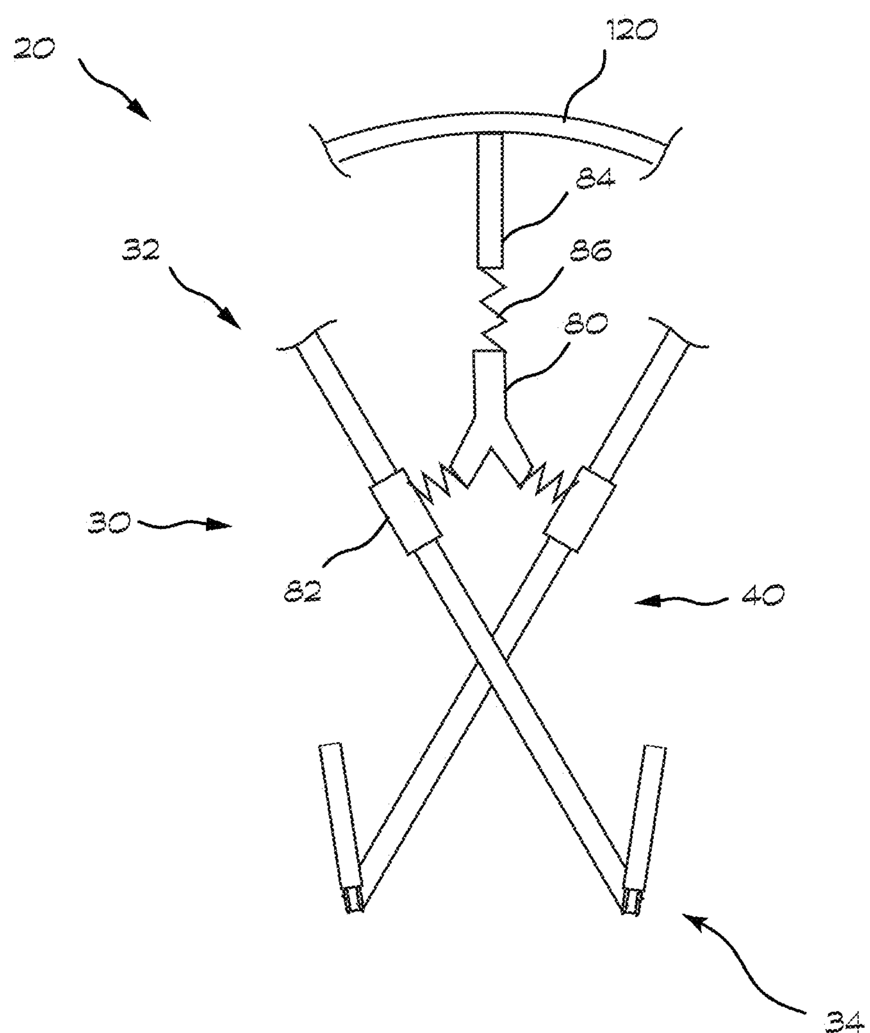
FIG. 7 is a schematic illustration of another embodiment of the stroller handle apparatus.

FIG. 7 is a schematic illustration of another embodiment of the stroller handle apparatus 20 shown connected to push bar 120 of a cooperating stroller. In this embodiment, first arm 30 and second arm 40 are crossed over one another, and first arm 30 is connected to second arm 40 intermediate first distal end 32 and the first proximal end 34. As shown, first arm 30 is connected to second arm 40 by a Y-shaped connector 80. Y-shaped connector 80 may have two sleeves 82 which the first and second arms may pass through. A base 84 of Y-shaped connector 80 may be coupled to push bar 120, for example by a rod and clamp or other connecting elements. Y-shaped connector 80 may include one or more springs 86 or other dampening mechanism, for example, sleeves 82 and base 84 of Y-shaped connector 80 may be interconnected by springs. Springs 86 further provide a tensionable connection between first arm 30 and second arm 40.

In other configurations, first arm 30 may be connected to second arm 40 intermediate first distal end 32 and the first proximal end 34 by one or more elastic members (e.g., bungee cords), a pin and slot arrangement, one or more pulleys, one or more differently shaped connectors (e.g., a X-shape), one or more guiding rods, or other devices configured to achieve the same result.

Further provided is a stroller, wherein handle apparatus 20 is packaged therewith and connected to the frame. In embodiments of the stroller, handle apparatus 20 is removably connected to the frame.

In terms of use, a method of pushing a stroller includes: (refer to FIGS. 1-8)

a) providing a stroller 100 comprising:
  a frame 120;
  a handle apparatus 20 connected to the frame, the handle apparatus including:
  a first arm 30 having a first distal end 32 and a first proximal end 34;
  a second arm 40 having a second distal end 42 and a second proximal end 44;
  two hand grips 22, each located at one of the first proximal end and the second proximal end;
  a dampening mechanism 24 configured to resist motion of each of the first arm and the second arm; and
  each of the first arm and the second arm being configured for connection to the frame of the stroller such that the first distal end and the second distal end are configured for forward and rearward motion;
b) gripping each of the hand grips;
c) moving forward while alternating motions of:
  (i) the first arm forwardly with the second arm rearwardly; and
  (ii) the second arm forwardly with the first arm rearwardly.

In addition, or instead, the stroller may be pushed forwardly straight ahead by gripping the hand grips so that each hand grip is substantially the same distance away from the user's body, and pushing forward with substantially even force applied by each arm. In this scenario, first arm and second arm will not move forwardly and rearwardly, and the handles may be used in a substantially fixed manner.

The method may further include positioning the first arm and the second arm so that there is tension therebetween.

The method may further include pivoting the first arm and the second arm about the frame of the stroller.

The method may further include, wherein in a), at least a portion of the first arm crosses over at least a portion of the second arm; and d) steering the stroller to a first side nearest the first proximal end by pushing the first proximal end forward while pulling the second proximal end rearward. Said a different way, in a configuration where first arm 30 and second arm 40 are crossed over one another, steering to the left may be performed by pushing first proximal end 34, located on the left side of the stroller, while pulling second proximal end 44. In this configuration, distal ends are located on opposite sides of the stroller from the proximal ends so that a push on a left side hand grip applies a pushing force to the right side of the stroller, and vice versa.

The method may further include steering the stroller to a first side nearest the first proximal end by pushing the second proximal end forward while pulling the first proximal end rearward. This method is suitable for a configuration where first arm 30 and second arm 40 are arranged side by side, such that a push on a left side hand grip applies a pushing force to the left side of the stroller.

The embodiments of the stroller handles and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the stroller handles and methods should be construed as limiting the invention to a particular embodiment or combination of embodiments. The scope of the invention is defined by the appended claims.

I claim:

1. A handle apparatus for attachment to a cooperating stroller having a frame, the handle apparatus comprising:
a first arm having a first distal end and a first proximal end;
a second arm having a second distal end and a second proximal end;
two hand grips, each located at one of the first proximal end and the second proximal end;
a dampening mechanism configured to resist motion of each of the first arm and the second arm;
each of the first arm and the second arm being configured for connection to the frame of the stroller such that the first distal end and the second distal end are configured for forward and rearward motion with respect to the stroller; and
wherein the first arm is tensionably coupled to the second arm.

2. The handle apparatus of claim 1, wherein the dampening mechanism includes one or more bumpers.

3. The handle apparatus of claim 1, wherein the first arm is connected to the second arm intermediate the first distal end and the first proximal end.

4. The handle apparatus of claim 1, wherein the first arm is coupled to the second arm such that forward motion of one of the first arm or the second arm imparts a rearward force to the other of the first arm or the second arm.

5. The handle apparatus of claim 1, wherein at least a portion of the first arm crosses over at least a portion of the second arm.

6. The handle apparatus of claim 1, wherein at least a portion of each of the first arm and the second arm has an adjustable length.

7. The handle apparatus of claim 1, wherein the hand grips are pivotably connected to the first proximal end and the second proximal end.

8. The handle apparatus of claim 1, wherein the forward and rearward motion of the first distal end and the second distal end occurs in a plane above the stroller.

9. The handle apparatus of claim 1, wherein the forward and rearward motion of the first distal end and the second distal end describes an arcuate or horn-shaped travel path.

10. A handle apparatus for attachment to a cooperating stroller having a frame, the handle apparatus comprising:
a first arm having a first distal end and a first proximal end;
a second arm having a second distal end and a second proximal end;
two hand grips, each located at one of the first proximal end and the second proximal end;
a dampening mechanism configured to resist motion of each of the first arm and the second arm;
each of the first arm and the second arm being configured for connection to the frame of the stroller such that the first distal end and the second distal end are configured for forward and rearward motion with respect to the stroller; and
wherein the first arm and the second arm are pivotably connected to the frame of the stroller.

11. The handle apparatus of claim 10, wherein the first arm is coupled to the second arm such that forward motion of one of the first arm or the second arm imparts a rearward force to the other of the first arm or the second arm.

12. The handle apparatus of claim 10, wherein the dampening mechanism includes one or more bumpers.

13. The handle apparatus of claim 10, wherein the forward and rearward motion of the first distal end and the second distal end occurs in a plane above the stroller.

14. A stroller comprising:
- a frame;
- a handle apparatus connected to the frame, the handle apparatus including:
  - a first arm having a first distal end and a first proximal end;
  - a second arm having a second distal end and a second proximal end;
  - two hand grips, each located at one of the first proximal end and the second proximal end;
  - a dampening mechanism configured to resist motion of each of the first arm and the second arm;
  - each of the first arm and the second arm being configured for connection to the frame of the stroller such that the first distal end and the second distal end are configured for forward and rearward motion; and
  - wherein the first arm is tensionably coupled to the second arm.

15. The stroller of claim 14, wherein the handle apparatus is removably connected to the frame.

16. The stroller of claim 14, wherein at least a portion of the first arm crosses over at least a portion of the second arm.

17. A method of pushing a stroller, the method comprising:
- a) providing a stroller comprising:
- a frame;
- a handle apparatus connected to the frame, the handle apparatus including:
  - a first arm having a first distal end and a first proximal end;
  - a second arm having a second distal end and a second proximal end;
  - two hand grips, each located at one of the first proximal end and the second proximal end;
  - a dampening mechanism configured to resist motion of each of the first arm and the second arm; and
  - each of the first arm and the second arm being configured for connection to the frame of the stroller such that the first distal end and the second distal end are configured for forward and rearward motion;
- b) gripping each of the hand grips;
- c) moving forward while alternating motions of:
  - (i) the first arm forwardly with the second arm rearwardly; and
  - (ii) the second arm forwardly with the first arm rearwardly; and
- d) steering the stroller to a first side nearest the first proximal end by pushing the second proximal end forward while pulling the first proximal end rearward.

18. The method of claim 17, further comprising:
- positioning the first arm and the second arm so that there is tension therebetween.

19. The method of claim 17, further comprising:
- pivoting the first arm and the second arm about the frame of the stroller.

20. The method of claim 17, further comprising:
- wherein in a), at least a portion of the first arm crosses over at least a portion of the second arm; and
- d) steering the stroller to a first side nearest the first proximal end by pushing the first proximal end forward while pulling the second proximal end rearward.

* * * * *